(12) United States Patent
Dai et al.

(10) Patent No.: US 7,629,291 B2
(45) Date of Patent: Dec. 8, 2009

(54) SURFACE-STABILIZED GOLD NANOCATALYSTS

(75) Inventors: Sheng Dai, Knoxville, TN (US); Wenfu Yan, Oak Ridge, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 642 days.

(21) Appl. No.: 11/166,950

(22) Filed: Jun. 24, 2005

(65) Prior Publication Data

US 2006/0293175 A1 Dec. 28, 2006

(51) Int. Cl.
*B01J 23/02* (2006.01)

(52) U.S. Cl. .................. 502/344; 502/302; 502/303; 502/304; 502/208

(58) Field of Classification Search ............... None
See application file for complete search history.

(56) References Cited

U.S. PATENT DOCUMENTS

| | | | |
|---|---|---|---|
| 3,873,469 A * | 3/1975 | Foster et al. ............ 502/242 |
| 5,958,829 A * | 9/1999 | Domesle et al. ......... 502/333 |
| 6,762,149 B2 * | 7/2004 | Tonkovich et al. ...... 502/439 |
| 6,800,584 B2 | 10/2004 | Baker et al. |
| 6,861,387 B2 * | 3/2005 | Ruth et al. .............. 502/184 |
| 7,071,239 B2 * | 7/2006 | Ortego et al. ........... 518/715 |
| 7,250,232 B2 * | 7/2007 | Boysen et al. .......... 429/33 |
| 2004/0127754 A1 * | 7/2004 | Yonehara et al. ........ 568/959 |
| 2005/0215428 A1 * | 9/2005 | Matsueda et al. ....... 502/328 |
| 2006/0140826 A1 * | 6/2006 | LaBarge et al. ......... 422/168 |

OTHER PUBLICATIONS

S. Arrii, F. Morfin, A.J. Renouprez, and J.L. Rousset, Oxidation of CO on Gold Supported Catalysts Prepared by Laser Vaporization: Direct Evidence of Support Contribution, 2004.
Jan-Dierk Grunwaldt, Christoph Kiener, Clemens Wogerbauer and Alfons Baiker, Preparation of Supported Gold Catalysts for Low-Temperature CO Oxidation via "Size-Controlled" 1998 Gold Colloids.

* cited by examiner

*Primary Examiner*—Melvin C Mayes
*Assistant Examiner*—Melissa Stalder
(74) *Attorney, Agent, or Firm*—Novak Druce + Quigg; Gregory A. Nelson; Gregory M. Lefkowitz

(57) ABSTRACT

A surface-stabilized gold nanocatalyst includes a solid support having stabilizing surfaces for supporting gold nanoparticles, and a plurality of gold nanoparticles having an average particle size of less than 8 nm disposed on the stabilizing surfaces. The surface-stabilized gold nanocatalyst provides enhanced stability, such as at high temperature under oxygen containing environments. In one embodiment, the solid support is a multi-layer support comprising at least a first layer having a second layer providing the stabilizing surfaces disposed thereon, the first and second layer being chemically distinct.

18 Claims, 9 Drawing Sheets

SURFACE-STABILIZED GOLD NANOCATALYSTS

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC and NSF grant CHE-0211029.

CROSS REFERENCE TO RELATED APPLICATIONS

Not applicable.

TECHNICAL FIELD

This invention relates to surface-stabilized gold and other noble metal nanocatalysts.

DESCRIPTION OF THE RELATED ART

At the nanoscale, substances can demonstrate chemical and catalytic activity when in the bulk form they are highly chemically and catalytically inactive. Gold is generally catalytically inactive, but when gold is less than about 10 nanometers thick, such as in the form of nanoparticles, it becomes an active catalyst.

Gold nanoparticles deposited on selected metal oxides exhibit surprisingly high catalytic activity for CO oxidation even at temperatures as low as 200 K. Gold nanoparticles can aid CO oxidation supported on semiconducting metal oxides such as $TiO_2$, $Al_2O_3$, $Fe_2O_3$, $Co_3O_4$, $NiO$, $SiO_2$, and $ZrO_2$, and alkaline earth metal hydroxides such as $Be(OH)_2$ and $Mg(OH)_2$. Au nanocatalysts have also been disclosed for both selective and nonselective oxidation of hydrocarbons, methanol synthesis by hydrogenation of carbon monoxide or dioxide, the water-gas shift, the reduction of nitric oxide by hydrogen, propene, or carbon monoxide, propylene epoxidation, PROX reaction, fuel cell applications, and hydrogenation of unsaturated hydrocarbons. However, a major problem preventing commercialization of gold catalysts lies in their limited stability. Specifically, current gold catalysts can be quickly deactivated when exposed to at least moderately high-temperature conditions (e.g. 300-500° C.). Deactivation under such moderately high-temperature conditions presently limits the industrial application of gold nanocatalysts.

SUMMARY

A surface-stabilized gold nanocatalyst comprises a solid support having stabilizing surfaces for supporting gold nanoparticles. A plurality of gold nanoparticles having an average particle size of less than 8 nm are disposed on the stabilizing surfaces. The surface-stabilized gold nanocatalyst provides high levels of stability against sintering under high temperature treatments, such as those encountered during typical catalyst applications (e.g., CO oxidation). Surface-stabilized gold nanocatalysts according to the invention following calcining provide a $T_{50}$ during lightoff testing as defined below of <−30° C., typically being from −40 to −80° C. Such stability of Au nanocatalysts according to the invention under high temperature treatments in $O_2$ containing environments is much better as compared to $TiO_2$-supported Au reference nanocatalyst supplied by the World Gold Council as part of an initiative to promote the use of gold in this type of industrial use.

The stability of the Au nanocatalysts described herein is also significantly better as compared to other known Au nanocatalysts. In addition, unexpectedly, the activity of the calcined catalyst according to the invention was found to be much higher than the activity of the as-synthesized catalyst the invention. Thus, the invention can be used to form highly stable Au or other noble metal nanocatalysts which could be industrially used and provide a significantly improved catalytic efficiency and industrial applicability.

As used herein, the terms/phrases "calcining" and "$T_{50}$ during lightoff testing" are defined by the following procedure: 50 mg of catalyst is packed into a 4 mm ID quartz U-tube, supported by quartz wool. Calcining treatments are carried out on the same instrument using pre-mixed 8% $O_2$ in He and heating at 500° C. for 2.5 hours (heating rate: 10° C./min). After the treatment step the sample is cooled in the treatment gas and then a lightoff curve is measured. Specifically, during reactions a gas stream of 1% CO balanced with dry air (<4 ppm water) is flowed at ambient pressure through the catalyst at a rate that is adjusted from sample to sample to maintain a constant space velocity of 44,400 ml/(hr·$gm_{catalyst}$) or about 37 $cm^3$/min. Gas exiting the reactor is analyzed. The data is reported as lightoff curves, displaying % CO conversion vs. temperature. The reaction temperature is varied using an oven or by immersing the U-tube in a dewar of ice water or of liquid nitrogen cooled acetone or dry ice cooled isopropanol which slowly warmed throughout the approximately 10 to 20 hours taken to measure the lightoff. The temperature which 50% conversion is provided is the $T_{50}$ temperature.

In one embodiment of the invention, the solid support comprises a plurality of rare earth comprising nanoparticles. The rare earth is preferably a non-oxide rare earth compound. The non-oxide rare earth compound can be a rare earth phosphate, such as $LaPO_4$. The $T_{50}$ during lightoff testing for the $LaPO_4$ embodiment can be between −60° C. and −90° C., such as between −80° C. and −90° C.

The stabilizing surfaces preferably comprise nanostructure surfaces. The solid support can be a multi-layer support comprising at least a first layer having a second layer providing the stabilizing surfaces disposed thereon, where the first and second layer are chemically distinct. The second layer can comprise aluminum oxide, while the first layer can comprises titanium dioxide.

The titanium dioxide layer is preferably in the form of nanoparticles. In this embodiment, the second layer can be a metal oxide layer. The first layer can comprise AlOOH (boehmite), preferably being in the form of nanoparticles.

A method of forming surface-stabilized gold nanocatalysts, comprises the steps of providing nanoparticles of a first chemical composition, depositing a second chemical composition different from the first composition on the nanoparticles to form multi-layer support particles having stabilizing surfaces. A plurality of gold nanoparticles having an average particle size of less than 8 nm are then depositing on the stabilizing surfaces. The surface stabilized gold nanocatalyst after calcining provide a $T_{50}$ during lightoff testing of <−30° C. The first and second chemical compositions can both be metal oxides. The first or second chemical composition can be aluminum oxides. The second chemical composition can comprise titanium dioxide.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE INVENTION

Figure 1:
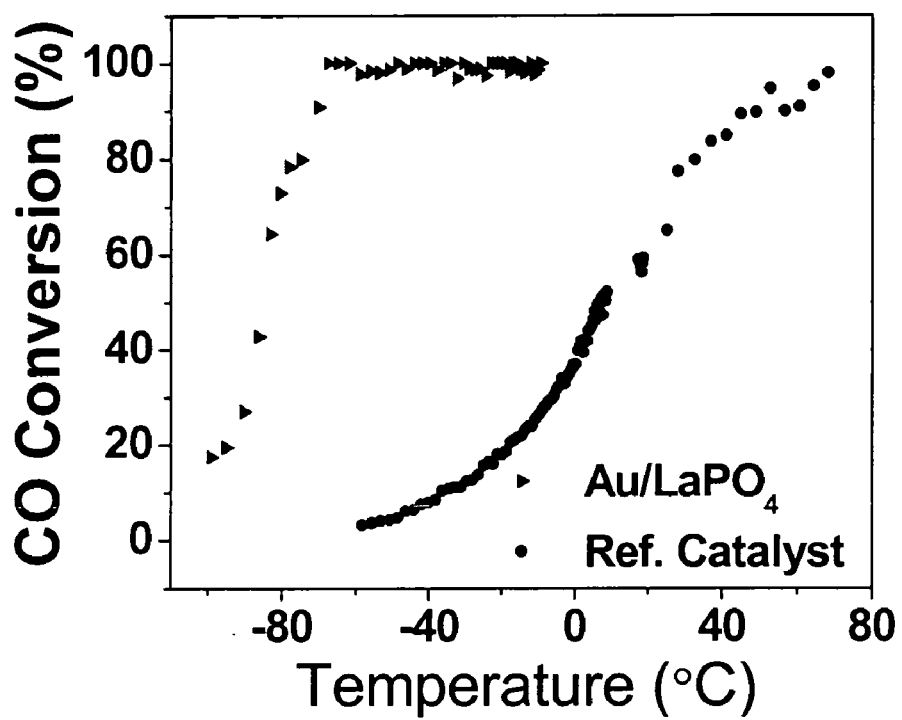
FIG. 1 are lightoff curves showing CO conversion % as a function of temperature for calcined Au nanocatalyst supported by $LaPO_4$ nanoparticles as compared to a reference catalyst supplied by World Gold Council.

The invention describes surface-stabilized noble metal nanocatalysts and methods for formation of the same. The stabilizing surfaces generally comprise nanostructured surfaces. The noble metal can be selected from the group consisting of Ag, Pt, Pd, Rh, Ru, Ir, Os or mixtures thereof. In a preferred embodiment, the noble metal is gold. Although the invention is described using the preferred noble metal gold, the invention is in no way limited to gold or gold alloys.

In a first embodiment, a gold nanocatalyst comprises a plurality of rare earth comprising nanoparticles, and a plurality of gold nanoparticles having an average particle size less than 8 nm disposed on the rare earth comprising nanoparticles. The nanoparticles of rare earth phosphates can be synthesized by process including ultra-sonication processing as described in the Examples below, or be purchased commercially. The average nanoparticles size discounting the few aggregated particles which are sometimes produced is preferably less that 4 nm, such as less than 3 nm, 2 nm, or more preferably <1 nm. The shape of the nanoparticles is generally raft-like.

The rare earth compound preferably comprises a non-oxide rare earth compound. For example, the non-oxide can be a rare-earth phosphate, such as $LaPO_4$. The $T_{50}$ during lightoff testing provided by this embodiment of the invention is preferably <−60° C., such as <−80° C.

In another embodiment of the invention, the solid support is a multi-layer support comprising at least a first layer having a second layer providing the stabilizing surfaces disposed thereon. The first and second layers are chemically distinct. The external surface of crystalline supports can be modified by various kinds of oxides via a layer-by-layer approach involving a surface sol gel process or atomic layer deposition as described in the Examples below. In general, this method can be applied to any surface that contains surface hydroxyl group which is accessible for the surface modification. Most of oxides have an —OH group terminated surface. Oxides for use with the invention include, but are not limited to, $TiO_2$, $Al_2O_3$, $Fe_2O_3$, $CO_3O_4$, NiO, $SiO_2$, and $ZrO_2$, $Y_2O_3$ and alkaline earth metal hydroxides such as $Be(OH)_2$ and $Mg(OH)_2$. Therefore, the invention is quite general for the surface modification of metal or semimetal oxides with metal or semimetal oxides.

In a preferred embodiment of the multi-layer support embodiment of the invention, the support provides a hydroxyl group terminated surface. For example, the second layer comprise aluminum oxide. In this embodiment, the first layer can comprise titanium dioxide. The first layer can comprise an aluminum oxide, such as AlOOH (boehmite). The second layer can comprise titanium oxide.

In yet another embodiment of the invention, a non-oxide catalytic system based on gold nanoparticles supported on Group IIIA phosphates, such as microporous aluminophosphate $AlPO_4$—H1, is described. Such nanocatalysts have been demonstrated to be extremely effective for selective oxidation of CO in the presence of $H_2$ at ambient temperature (preferential CO oxidation, referred to as the "PROX" process). Because of stringent CO intolerance for proton exchange membrane (PEM) fuel cells, it is desirable to provide essentially CO-free fuel processing alternatives. The step-wise reforming of hydrocarbons can be used for production of CO-free hydrogen for fuel cell applications. The decomposition of hydrocarbons being the first step of the step-wise reforming process has been extensively investigated. Both steam and air have been employed for catalyst regeneration in the second step of the process. Since PEMs are poisoned by very low (e.g. ppm) levels of CO, it is very important to eliminate even trace amounts of CO from the reformate stream. Preferential oxidation of CO(PROX) is considered to be a promising method for trace CO clean up. The high activity and stability of Au—$AlPO_4$—H1 for PROX processing can be used as an effective catalysis for the production of CO-free $H_2$.

Au nanocatalysts supported by microporous aluminophosphate ($AlPO_4$—H1) described in Example 4 can easily reach 100% efficiency for CO oxidation at ambient temperature. However, such nanocatalysts tend to deactivate slowly under use. However, when mixed some hydrogen ($H_2$) into the feed, surprisingly, this catalyst was found to be very active for CO oxidation and stable for a long time run and be non-active for $H_2$ oxidation, which meets the requirements for the PROX reaction for fuel cell applications. Although such nanocatalysts were not tested at temperatures below room temperature, its low temperature behavior when mixed with $H_2$ is expected to be quite good. The $T_{50}$ for the as-synthesized catalyst with 14 vol % $H_2$ (e.g. 5 ml/min $H_2$, 32 ml/min 1% CO in air, total flow rate is 37 ml/min, which will give a GHSV of 44,400 ml/(hr·$gm_{catalyst}$) for this nanocatalyst embodiment (e.g. (Au/AlPO$_4$—H1) is expected to reach <−30° C.

Others porous as well as nonporous crystalline aluminophosphates are expected to provide similar results. Because, Al (aluminum, aluminium), Ga (gallium), and In (indium) are in the same family (Group IIIA), it is expected that GaPO$_4$ and InPO$_4$ will have similar properties to AlPO$_4$. Other metal phosphates, such as NiPO$_4$ (nickel phosphate, porous or nonporous crystalline) and YPO$_4$ (yttrium phosphates) are also expected to be useful supports for efficient CO-selective oxidation catalytic system based on gold operable at ambient temperature.

Although the supports described above are all generally nanoparticle-based, nanoparticles can also be disposed on nanostructured sheets or rod-like supports. However, the catalytic activity and stability of gold nanocatalysts on sheet or rod supports is generally not as high as those supported by nanoparticles. The size of the support, in some cases, can affect the activity and stability of supported Au nanoparticles.

Expected uses for high stability and other noble metal Au nanocatalysts according to the invention include both selective and nonselective oxidation of hydrocarbons, both selective and nonselective oxidation of carbon monoxide, and both selective and nonselective oxidation of $H_2$. Moreover, such nanocatalysts according to the invention can also be used for methanol synthesis by hydrogenation of carbon monoxide or dioxide, the water-gas shift, the reduction of nitric oxide by hydrogen, propylene epoxidation, hydrogenation of unsaturated hydrocarbons, and fuel-cell systems. All these reactions play important roles in the chemical industry.

EXAMPLES

It should be understood that the Examples described below are provided for illustrative purposes only and do not in any way define the scope of the invention.

Example 1

Ultra-Stable Au Catalysts Deposited on the Surface of Lanthanum Phosphate (LaPO$_4$) Nanoparticles LaPO$_4$ nanoparticles were first prepared. In a typical synthesis, 20 mL of 1.0 M NaOH solution was sonicated by employing a direct immersion titanium horn (Sonics and Materials, VCX-750, 20 kHz, and starting power 30 W/cm$^2$) followed by a drop-injection of 10 mL of 0.60 M LaCl$_3$ solution into the sonication cell. Subsequently, a solution of 0.804 g of (NH$_4$)$_2$HPO$_4$ dissolved in 20 g of deionized water was droply injected into the above solution during the sonication. After that, the pH value of the resulting solution was adjusted to 12 by a solution of 4 M NaOH. The mixture was further sonicated continuously for 1 hour and the sonication was conducted with air-cooling. The white precipitates were separated by centrifugation and washed several times with deionized water and once with methanol. The product was dried in air at room temperature.

Ultra-small Au nanoparticles are then deposited on the surface of as-synthesized LaPO$_4$ nanoparticles. Initially, 0.42 g of hydrogen tetrachloroaurate (III) trihydrate (HAuCl$_4$.3H$_2$O, 99.9+%, Aldrich) was dissolved into 70 mL deionized water. The pH value of the resulting solution was adjusted to 10.0 with vigorous stirring using a solution of 1.0 M KOH at room temperature. After pH adjustment, the solution was heated in an 80° C. water bath followed by the addition of the above prepared LaPO$_4$ nanoparticles. The resulting mixture was continually stirred for 2 hours. Finally, the precipitates were separated by centrifugation and washed several times with deionized water. The product was dried at 40° C. in air overnight to obtain the as-synthesized catalyst.

The stability of Au nanocatalyst supported on LaPO$_4$ nanoparticles according to the invention formed as described above was compared to a TiO$_2$ supported Reference Au Catalyst supplied by the World Gold Council (Sample Number 55, Lot Number Au—TiO$_2$ #02-5). The CO oxidation reaction was carried out in an AMI 200 (Altamira Instruments). Fifty (50) mg of catalyst was packed into a 4 mm ID quartz U-tube, supported by quartz wool. Sample treatments were carried out on the same instrument using pre-mixed 8% O$_2$ in He and heating at 500° C. for 2.5 hours (heating rate: 10° C./min). After treatment step the sample was cooled in the treatment gas and then a lightoff curve was measured. During reactions a gas stream of 1% CO balanced with dry air (<4 ppm water) was flowed at ambient pressure through the catalyst at a rate that was adjusted from sample to sample to maintain a constant space velocity of 44,400 ml/(hr·$gm_{catalyst}$) or about 37 cm$^3$/min. Gas exiting the reactor was analyzed by a Buck Scientific 910 gas chromatograph equipped with dual molecular sieve/porous polymer column (Alltech CTR1) and using a thermal conductivity detector. The data was reported as lightoff curves, displaying conversion vs. temperature. The reaction temperature was varied using an oven or by immersing the U-tube in a dewar of ice water or of liquid nitrogen cooled acetone or dry ice cooled isopropanol which slowly warmed throughout the approximately 10 to 20 hours taken to measure a lightoff.

FIG. 1 shows the lightoff curves of calcined World Gold Council reference catalyst and Au nanocatalyst supported by LaPO$_4$ nanoparticles according to the invention. Clearly, the high temperature treatment stabilized the Au nanoparticles supported by LaPO$_4$ nanoparticles according to the invention and the $T_{50}$ temperature reached at a much lower temperature as compared to the World Gold Council reference catalyst (−85° C. VS 14° C.). This data demonstrates that the Au nanocatalyst supported by LaPO$_4$ nanoparticles according to the invention has much better catalytic activity as compared to the World Gold Council reference catalyst after lengthy treatments in oxygen comprising environments and high temperate typical of most industrial uses for gold nanocatalysts.

Figure 2:
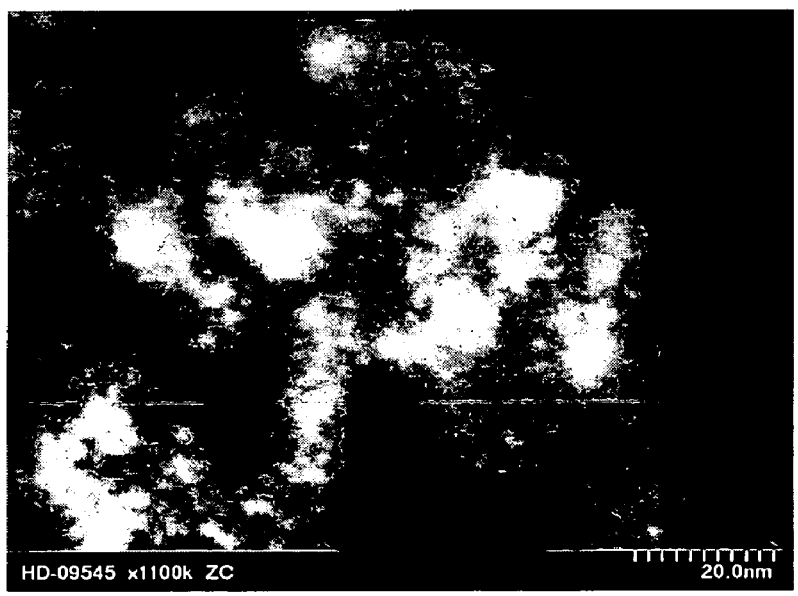
FIG. 2 is a scanned Z-contrast TEM image of as-synthesized Au nanocatalyst supported by $LaPO_4$ nanoparticles according to the invention.

FIG. 2 is a scanned high-angle annular dark-field (HAADF) Z-contrast TEM image of as-synthesized Au nanocatalyst supported by LaPO$_4$ nanoparticles according to the invention. Imaging with a high-angle annular dark-field detector shows the tiny, highly uniform Au nanoparticles (0.8-2.0 nm diameter) distributed on the substrate in the as-synthesized catalyst.

Figure 3:
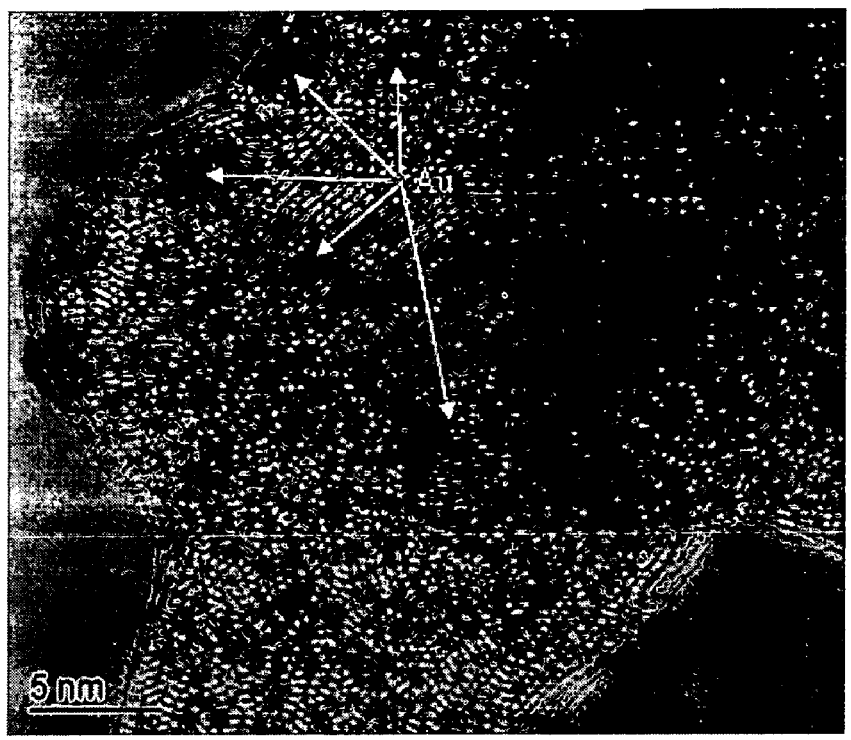
FIG. 3 is a scanned high resolution TEM (HRTEM) image of as-synthesized Au nanocatalyst supported by $LaPO_4$ nanoparticles according to the invention.

FIG. 3 shows a high resolution scanned TEM (HRTEM) image of as-synthesized Au nanocatalyst according to the invention. The Au particles in as-synthesized form are quite small and uniform with a mean size of about 2 nm which is consistent with routine STEM analyses. Because of its cationic nature, the lattice of the Au nanoparticles is not very clear in the HRTEM image.

Figure 4:
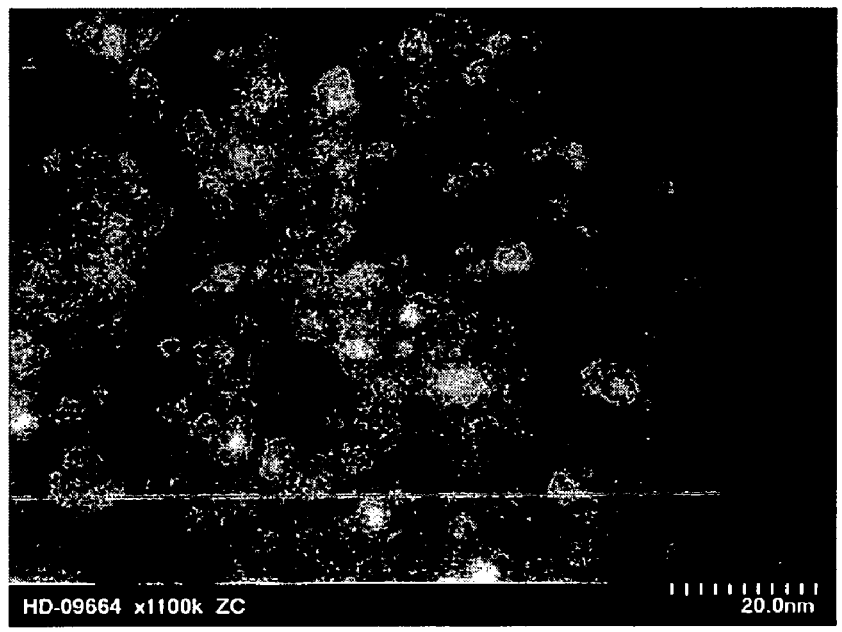
FIG. 4 is a scanned Z-contrast TEM image of calcined Au nanocatalyst supported by $LaPO_4$ nanoparticles according to the invention.

After the high temperature calcination, Z-contrast image were recorded for nanocatalyst according to the invention. FIG. 4 shows the scanned Z contrast TEM image which evidence clear differences in size distribution. Most of the Au nanoparticles grew up a little during the calcination and reached a size of about 1-4 nm.

Figure 5:
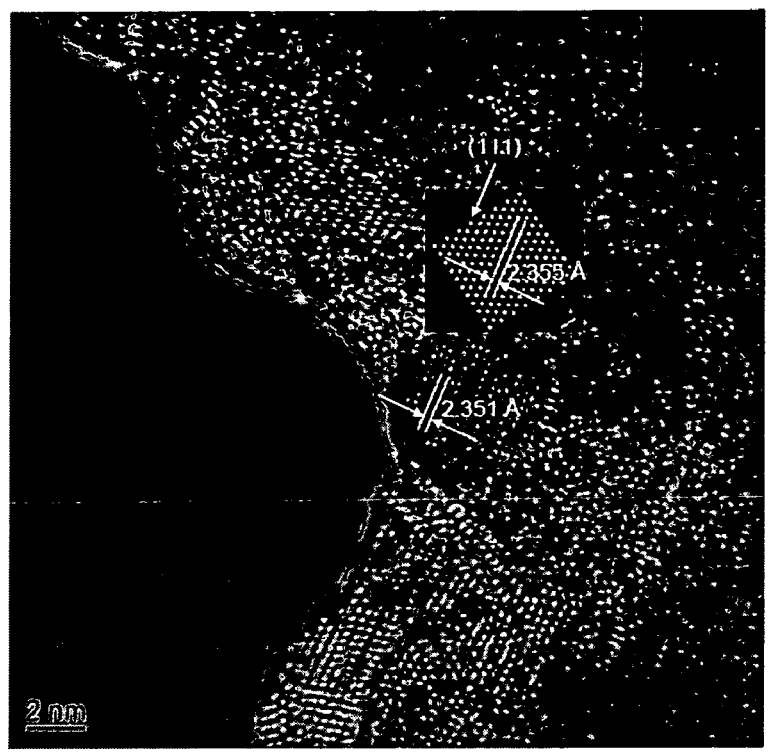
FIG. 5 is a scanned HRTEM image of calcined Au nanocatalyst supported by $LaPO_4$ nanoparticles according to the invention.

The high resolution TEM (HRTEM) scanned image shown in FIG. 5 reveals the crystalline nature of the Au nanoparticles. The distance between two (111)s measured by the HRTEM was 2.351 Å, which is consistent with that of 2.355 Å measured from Au structural models. The right up inset is the electron-diffraction pattern of this Au nanoparticle showing the lattice spacing.

Example 2

Ultra-Stable Au Catalysts Deposited on the Surface of the External-Surface Aluminum Oxide Modified Crystalline $TiO_2$ External-surface aluminum oxide modified crystalline $TiO_2$ was first prepared. Three (3.0) g of commercial $TiO_2$ nanoparticles Degussa P25 or Aldrich anatase powder and one magnetic bar were loaded into a reflux bottle and dried at 125° C. for 16 hours. After that, the bottle was sealed with a pre-dried rubber septum. Subsequently, aluminum tri-sec-butoxide, $[C_2H_5CH(CH_3)O]_3Al$ and anhydrous toluene (20 mL) and methanol (20 mL) were transferred into the bottle through a syringe using a standard Schlenk procedure and the solution was refluxed for 3 hours. The final product was filtered, washed several times with absolute-200 proof ethanol and deionized water and dried at 80° C. overnight.

Ultra-small Au nanoparticles were then deposited on the surface-modified crystalline $TiO_2$ using a deposition precipitation process. 0.3 g of hydrogen tetrachloroaurate (III) trihydrate ($HAuCl_4.3H_2O$, 99.9+%, Aldrich) was dissolved into 50 mL deionized water. The pH value of the resulting solution was adjusted to 10.0 with vigorous stirring using a solution of 1.0 M KOH at room temperature. After pH adjustment, the solution was heated in an 80° C. water bath followed by the addition of 1.0 g of surface modified $TiO_2$ powder. The resulting mixture was continually stirred for 2 hours. Finally, the precipitates were separated by centrifugation and washed three times with deionized water and once with ethanol. The product was dried at 40° C. temperature in air overnight to obtain the as-synthesized catalyst.

Figure 6:
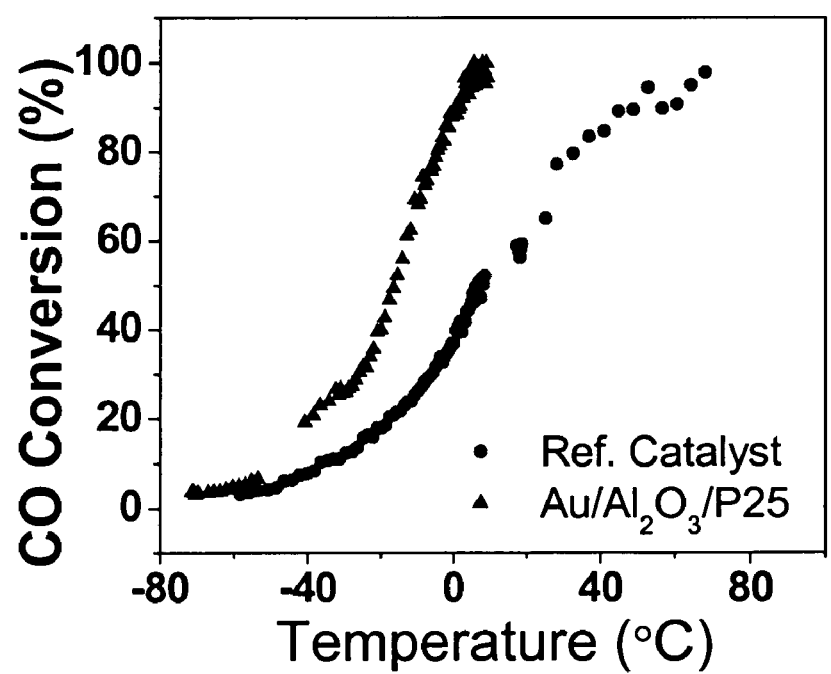
FIG. 6 are Lightoff curves showing CO conversion % as a function of temperature for calcined reference catalyst and $Au/Al_2O_3/TiO_2$ (P25) according to the invention.

The stability of Au nanocatalyst supported by external-surface aluminum oxide modified crystalline $TiO_2$ was compared to $TiO_2$ supported Reference Au Catalyst supplied by the World Gold Council (Sample Number 55, Lot Number Au—$TiO_2$ #02-5). The CO oxidation reaction and high temperature treatments on both samples were carried out with an identical protocol used in Example 1. FIG. 6 shows the lightoff curves of calcined World Gold Council reference catalyst as compared to the Au nanocatalyst supported by external-surface aluminum oxide modified crystalline P25 according to the invention. After the calcination, the $T_{50}$ of calcined Au nanocatalyst supported by external-surface aluminum oxide modified crystalline $TiO_2$ according to the invention was –17° C., which is significantly lower than that of calcined $TiO_2$ supported Reference Au Catalyst supplied by the World Gold Council.

Figure 7:
FIG. 7 is a scanned Z-contrast TEM image of as-synthesized $Au/Al_2O_3/TiO_2$ (P25) according to the invention.
Figure 8:
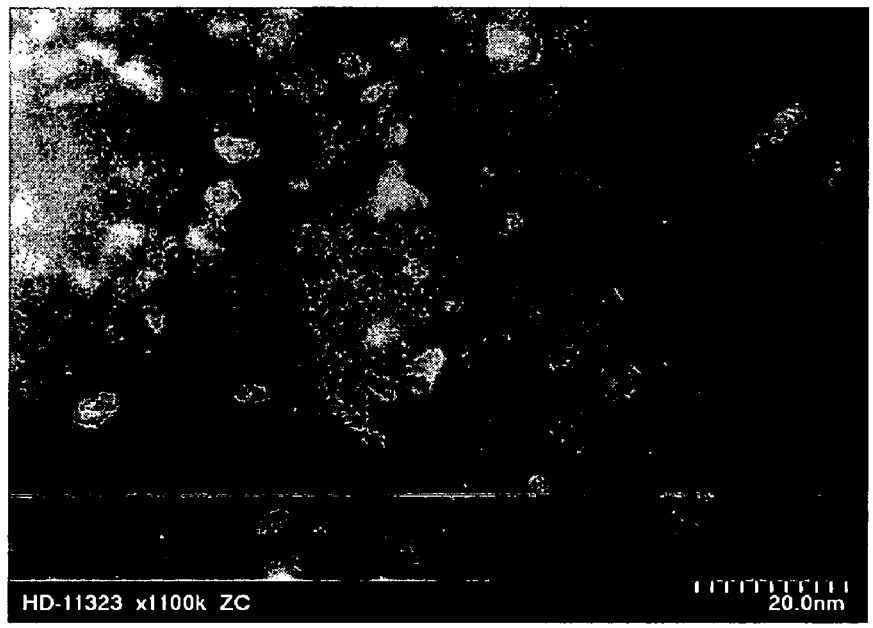
FIG. 8 is a scanned Z-contrast TEM image of calcined $Au/Al_2O_3/TiO_2$ (P25) according to the invention.
Figure 9:
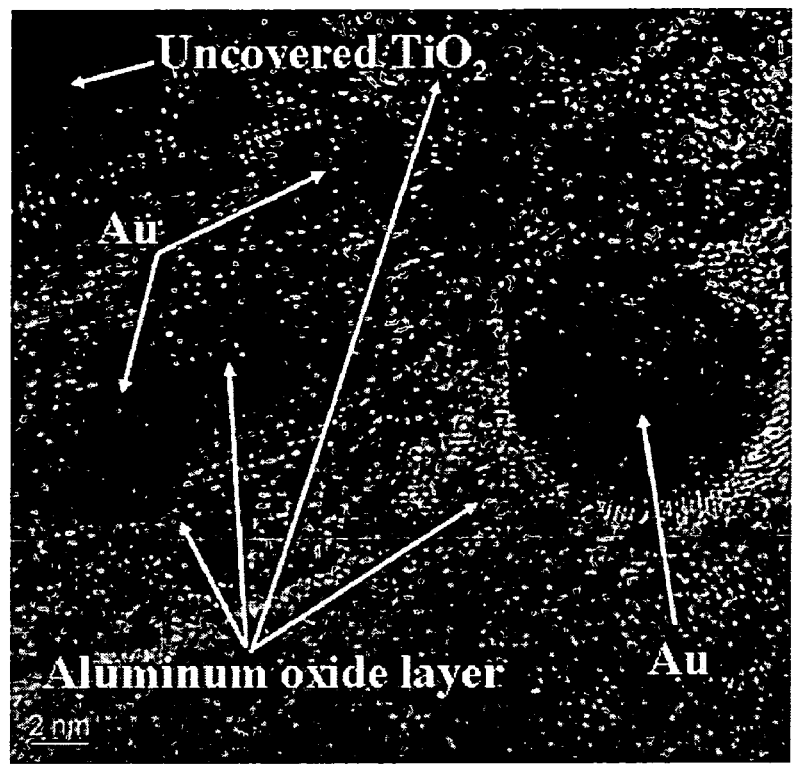
FIG. 9 is a scanned HRTEM image of as-synthesized $Au/Al_2O_3/TiO_2$ (P25) according to the invention.

The $Au/Al_2O_3/TiO_2$ (P25) nanocatalyst according to the invention was then characterized. FIG. 7 is a scanned Z-contrast TEM image of the as-synthesized $Au/Al_2O_3/TiO_2$, while FIG. 8 is a Z-contrast TEM image of calcined $Au/Al_2O_3$/P25 according to the invention which reveals tiny, highly uniform bright spots (0.8-4.0 nm diameter) which correspond to the deposited gold nanocrystal species. FIG. 9 is a scanned HRTEM image of as-synthesized $Au/Al_2O_3/TiO_2$ (P25). The HRTEM image of the as-synthesized $Au/Al_2O_3$/P25 reveals that the surface of the P25 was partially covered by an amorphous aluminum oxide layer and that the Au nanoparticles were deposited on the amorphous layer. Due to its cationic nature, it is believed that the lattice structure of the Au nanoparticles is not very clear in the scanned images provided.

Figure 10:
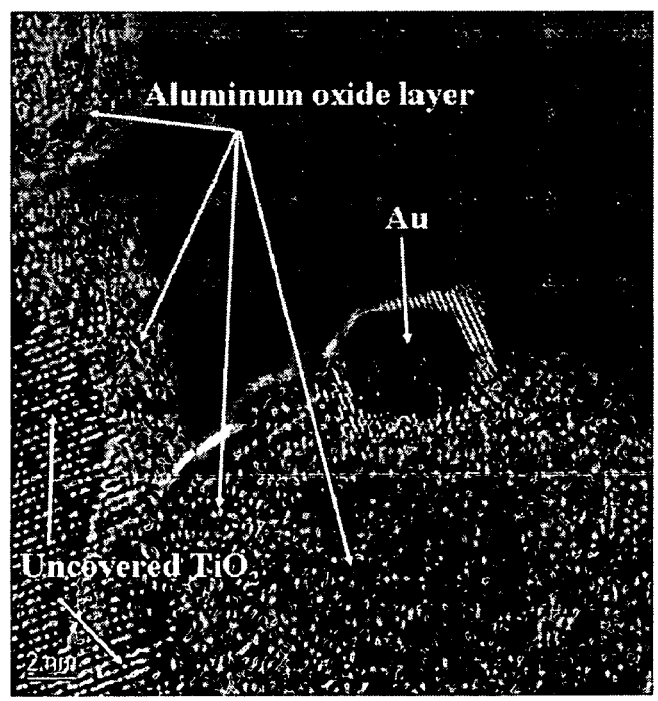
FIG. 10 is a scanned HRTEM image of calcined $Au/Al_2O_3/TiO_2$ (P25) according to the invention.
Figure 11:
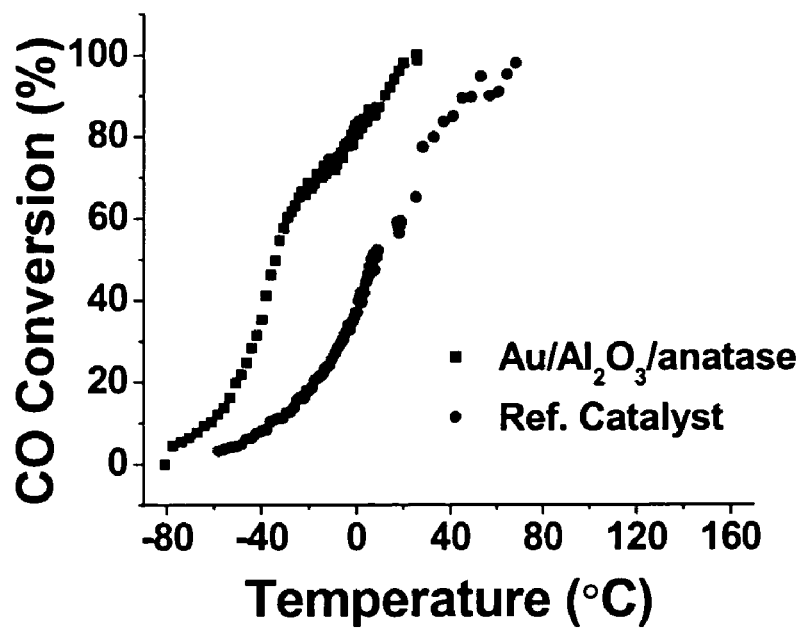
FIG. 11 are lightoff curves showing CO conversion % as a function of temperature for calcined reference catalyst as compared to an $Au/Al_2O_3/TiO_2$ (anatase) nanocatalyst according to the invention.

FIG. 10 is a scanned HRTEM image of calcined $Au/Al_2O_3/TiO_2$ (P25). After calcination, the Au nanoparticles remained fixed on the amorphous aluminum oxide layer with clearly visible lattice structure. XRD analysis confirmed there was no detectable crystalline alumina in the calcined catalyst, while ICP and EDX analysis confirmed the existence of aluminum in the catalyst. This information strongly suggests that the amorphous aluminum oxide layer played an important role in the stabilization of the supported Au nanoparticles. FIG. 11 are lightoff curves showing CO conversion % as a function of temperature for calcined Reference Catalyst as compared to $Au/Al_2O_3/TiO_2$ (anatase) nanocatalysts according to the invention.

Example 3

Preparation of the Ultra-Stable Au Catalysts Deposited on the Surface of the External-Surface Titanium Oxide Modified Crystalline Aluminum Oxide (AlOOH)

External-surface titanium oxide modified crystalline AlOOH was first prepared. Three (3.0) g of commercial aluminum oxide (AlOOH) nanoparticles (Aldrich) or CATAPAL A aluminum oxide powder (Sasol North America Inc.) and one magnetic bar were loaded into a reflux bottle and dried at 125° C. for 16 hours. After that, the bottle was sealed with a pre-dried rubber septum. Subsequently, 6.0 mL of titanium (IV) butoxide (Aldrich, 97%) and anhydrous toluene (20 mL) and methanol (20 mL) were transferred into the bottle through a syringe using a standard Schlenk procedure and the solution was refluxed for 3 hours. The final product was filtered, washed several times with absolute-200 proof ethanol and deionized water and dried at 80° C. overnight.

Ultra-small Au nanoparticles were then deposited on the surface-modified crystalline AlOOH using a deposition precipitation process. 0.3 g of hydrogen tetrachloroaurate (III) trihydrate ($HAuCl_4.3H_2O$, 99.9+%, Aldrich) was dissolved into 50 mL deionized water. The pH value of the resulting solution was adjusted to 10.0 with vigorous stirring using a solution of 1.0 M KOH at room temperature. After pH adjustment, the solution was heated in an 80° C. water bath followed by the addition of 1.0 g of surface modified AlOOH powder. The resulting mixture was continually stirred for 2 hours. Finally, the precipitates were separated by centrifugation and washed three times with deionized water and once with ethanol. The product was dried at 40° C. temperature in air overnight to obtain the as-synthesized catalyst.

Figure 12:
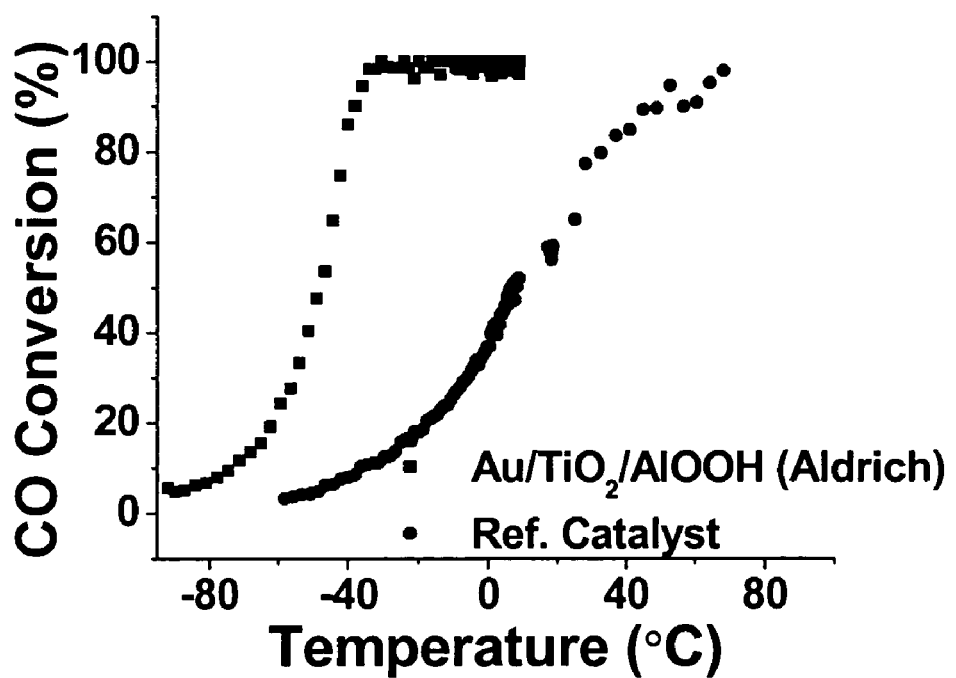
FIG. 12 are lightoff curves showing CO conversion % as a function of temperature of calcined Reference Catalyst as compared to $Au/TiO_2/AlOOH$ nanocatalyst according to the invention.

The stability of Au nanocatalyst supported by external-surface titanium oxide modified crystalline AlOOH according to the invention was compared to a $TiO_2$ supported Reference Au Catalyst supplied by the World Gold Council (Sample Number 55, Lot Number Au—$TiO_2$ #02-5). The CO oxidation reaction and high temperature treatments on both samples were carried out with an identical protocol used in Examples 1 and 2. FIG. 12 shows the lightoff curves of calcined Reference Catalyst and Au nanocatalyst supported by external-surface titanium oxide modified crystalline AlOOH (Aldrich) according to the invention. After the calcination, the $T_{50}$ of calcined Au nanocatalyst supported by external-surface aluminum oxide modified crystalline $TiO_2$ is –47° C., which is significantly lower as compared to calcined $TiO_2$ supported Reference Au Catalyst supplied by the World Gold Council.

Figure 13:
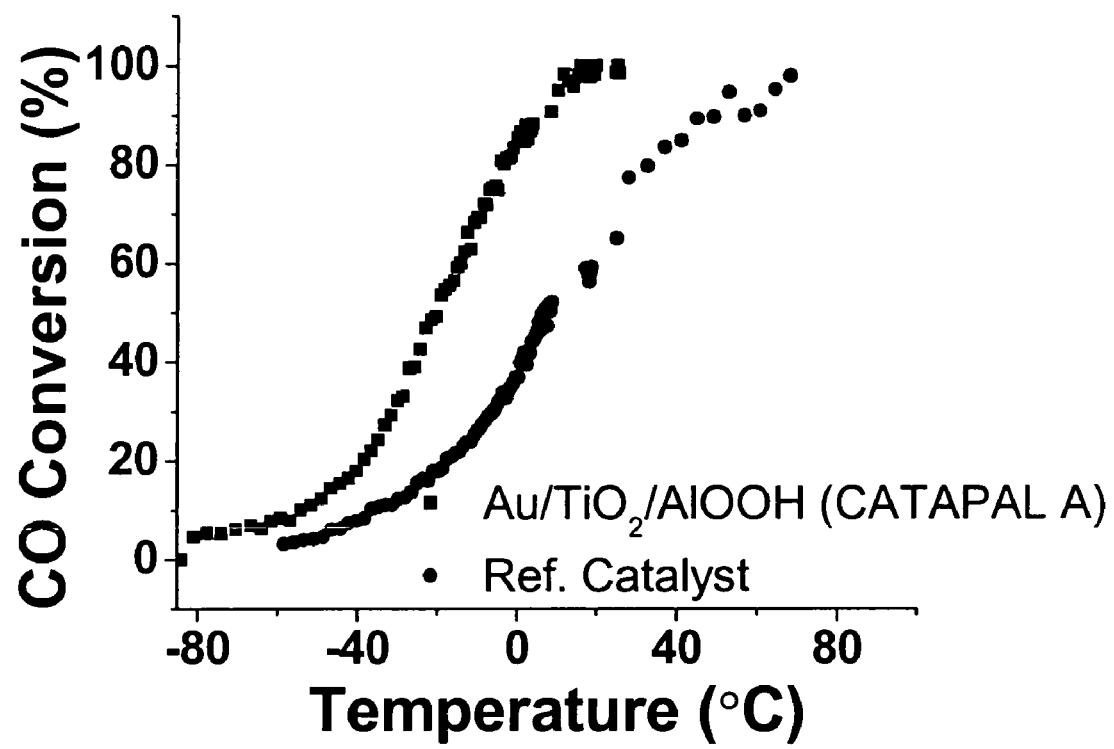
FIG. 13 are lightoff curves showing CO conversion % as a function of temperature. The lightoff curves of calcined reference catalyst are compared to $Au/TiO_2/AlOOH$ nanocatalysts according to the invention.

FIG. 13 are lightoff curves showing CO conversion % as a function of temperature. The lightoff curves of calcined reference catalyst are compared to Au/TiO$_2$/AlOOH nanocatalysts according to the invention.

Example 4

Preparation of Gold Nanoparticles Supported on Microporous Aluminophosphate

In another inventive embodiment, an efficient CO-selective oxidation catalytic system based on gold nanoparticles supported on a microporous aluminophosphate operable at ambient temperature is described. Such nanocatalysts have been found to be highly effective for selective oxidation of CO in the presence of H$_2$ at ambient temperature (the PROX process). Microporous aluminophosphates, such as aluminosilicate zeolites, have not only the well-defined channels but also large inner surfaces, which promote their potential for applications in adsorption, catalysis, and host-guest assembly chemistry. These wide channels enable VPI-5 to be effective catalyst supports and can adsorb molecules as large as triisopropyl benzene (diameter 13 Å). VPI-5 is isostructural with AlPO$_4$—H1, which was prepared about 40 years ago by d'Yvoire. In contrast to VPI-5, AlPO$_4$—H1 can be conveniently synthesized without any organic template via a microwave process. Like the other members in the aluminophosphates family, both Al and P atoms are tetrahedrally coordinated by framework bridged oxygen atoms and alternate on the framework in AlPO$_4$—H1. Therefore, the Al/P ratio is unity, and the framework is neutral unlike those of negatively charged aluminosilicate zeolites. The neutral framework is used to precipitate gold precursors according to the invention under basic conditions without the constraint of ioselectric points.

AlPO$_4$—H1 was first prepared in a gel system with a molar composition of 1.0Al$_2$O$_3$:0.8P$_2$O$_5$:1.2HCl:50H$_2$O according to Kunii, K.; Narahara, K.; Yamanaka, S.; *Microporous. Mesoporous. Mater.* 2002, 52, 159. Typically, 5.0 g of aluminum hydroxide (Aldrich, 50-57% Al$_2$O$_3$) was dissolved in 24.3 g of deioned water. Stirring of mixture continued for 1 hour. Then, 2.92 mL of phosphoric acid (Aldrich, 85 wt % in water) was added dropwise. After that, 2.69 mL of concentrated hydrochloric acid (Aldrich, 37 wt % in water) was added dropwise and the mixture was stirred for an additional hour. The homogeneous mixture was sealed in a Teflon autoclave and heated under autogenous pressure at 125° C. for 70 minutes in a microwave oven (Milestone Inc., 1000 W, 2.45 GHz, heating rate, 1° C./sec). The product was separated by centrifugation, washed with deioned water, and dried overnight at room temperature.

The deposition-precipitation (DP) of ultra-small gold nanoparticles on the as-synthesized AlPO$_4$—H1 followed. The Au precursor was introduced on AlPO$_4$—H1 via a deposition-precipitation method originally developed by Haruta and coworkers (See Tsubota, S.; Haruta, M.; Kobayashi, T.; Ueda, A.; Nakahara, Y.; Stud. Surf. Sci. Catal. 1991, 63, 695). Firstly, 3.0 g of hydrogen tetrachloroaurate (III) trihydrate (HAuCl$_4$.3H$_2$O, 99.9+%, Aldrich) was dissolved into 500 mL deionized water to form a gold precursor solution. Typically, the pH value of the pre-weighed gold precursor solution (25 mL) was adjusted to about 10 with vigorous stirring using a solution of 1.0 M KOH at room temperature. The solution was then heated with a 60° C. water bath and an as-synthesized AlPO$_4$—H1 (0.5 g) was added with stirring. The resulting cloudy solution was continually stirred for 2 hours. The precipitates were separated by centrifugation and washed three times with deionized water. The product was dried at 40° C. overnight. gold loading as high as about 7.2 wt % on AlPO$_4$—H1 can be achieved.

Figure 14A:
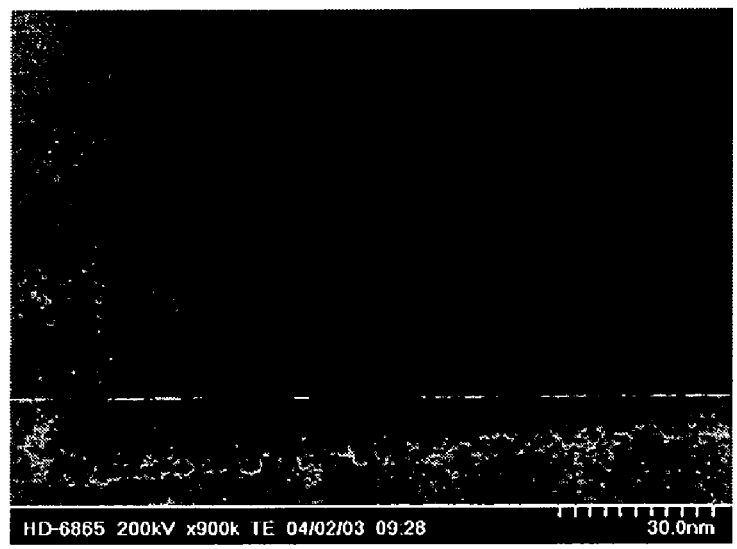
FIG. 14 are bright (a) and dark-field (b) scanned TEM images of the as-synthesized Au—$AlPO_4$—H1, respectively.
Figure 14B:
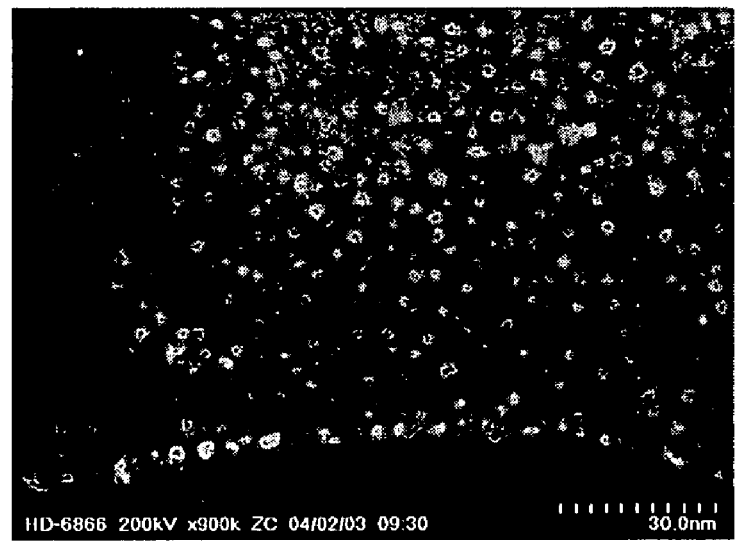

The powder X-ray diffraction (XRD) patterns obtained from the as-synthesized AlPO$_4$—H1 is consistent with a crystalline VFI structure. The concentration and size distribution of Au nanoparticles on the substrate of AlPO$_4$—H1 were investigated by the scanning transmission electron microscopy (STEM). FIG. 14 shows the bright (a) and dark-field (b) scanned TEM images of the as-synthesized Au—AlPO$_4$—H1, respectively. The tiny bright spots in the dark field (Z-contrast) image (b) shown correspond to the gold precursor particles in the size range of about 0.5-2 mm, while the ordered line structures in the bright field image (a) represent the zeolitic channels. The XRD pattern of Au—AlPO$_4$—H1 reduced in H$_2$ at 100° C. taken showed no characteristic peaks related to gold, indicating that the gold nanoparticles exist as ultrasmall clusters. Accordingly, the framework of the AlPO$_4$—H1 facilitates the formation of highly dispersed gold nanoparticles.

The CO oxidation reaction was carried out in a 0.35 ml fix bed quartz micro-reactor at room temperature and ambient pressure. Typically, 50 mg of catalyst was packed in the middle of the reactor and supported by quartz wool. A gas stream of 1% CO balanced with dry air (<4 ppm water) flowed through the catalyst at 37 cm$^3$/min (i.e., GHSV=44,400 ml/(hr·gm$_{catalyst}$)). The exit gas was analyzed periodically by a gas chromatograph. The CO conversion is defined as the ratio of the moles of CO consumed to the initial moles of CO. The oxidation of CO was conducted using Au—AlPO$_4$—H1 catalysts with different pretreatments: (i) as-synthesized catalyst without any pretreatment, (ii) reduced by a 12% H$_2$—He at 100° C. for 30 minutes, and (iii) treated by an 8% O$_2$—He at 100° C. for 30 minutes.

Figure 15:
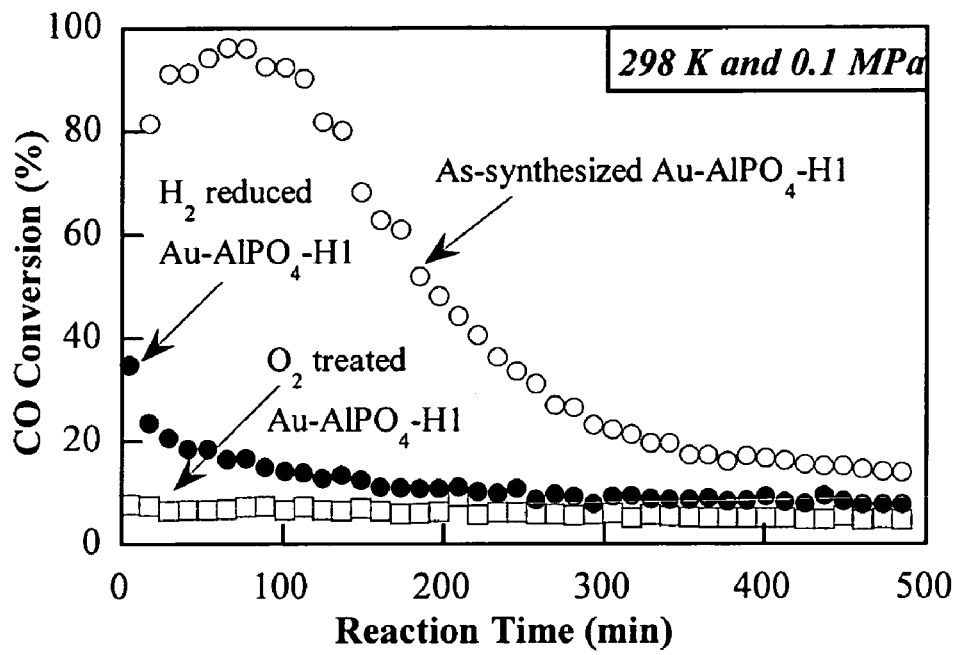
FIG. 15 compares CO conversion % of the as-synthesized, reduced, and $O_2$-treated Au—$AlPO_4$—H1 catalysts as function of reaction time.

The comparison of CO conversion % of the as-synthesized, reduced, and O$_2$-treated Au—AlPO$_4$—H1 catalysts as function of reaction time is shown in FIG. 15. Both reduced and O$_2$-treated catalysts exhibited lower activity for CO oxidation as compared to the as-synthesized catalysts. A stable CO conversion at 6%, which was independent upon reaction time, was obtained over oxidized catalyst. For the reduced catalyst, followed by an initial 35% CO conversion, the catalytic activity decreased with reaction time. The CO conversion over the reduced catalyst finally decreased to 12% after 100 min. The as-synthesized Au—AlPO$_4$—H1 gave the highest activity among three catalysts. The CO conversion of 100% was achieved over the as-synthesized Au—AlPO$_4$—H1 after 1 h reaction, followed by the gradual decline of CO conversion and finally reached 16%. No Au particle size change was observed using STEM. Thus, it was concluded that the deactivation of the catalyst did not result from Au sintering.

Figure 16:
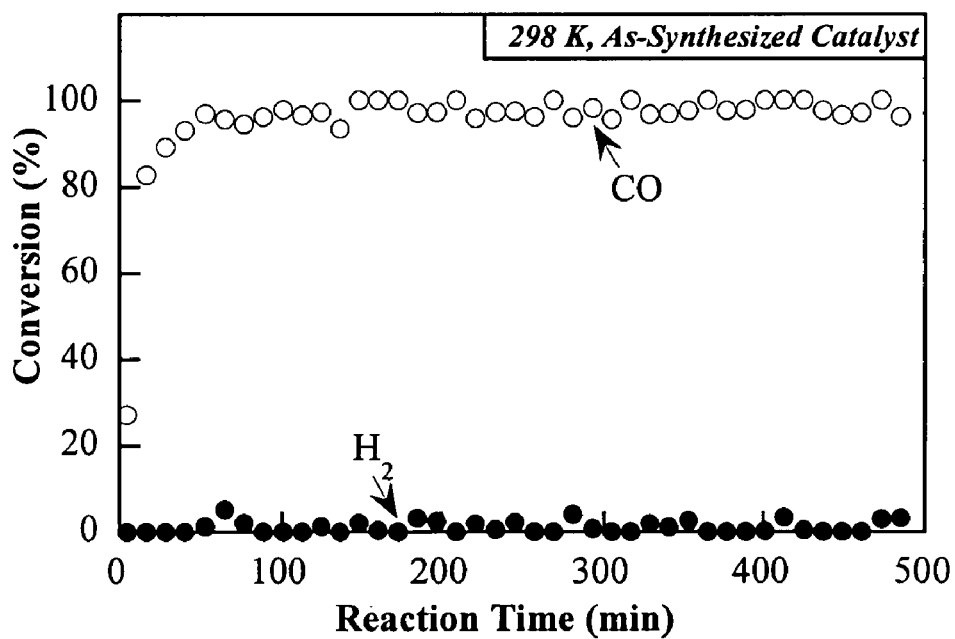
FIG. 16 shows the conversion % for CO oxidation over as-synthesized Au—$AlPO_4$—H1 in presence of $H_2$ over an eight (8) hour period.

The conversion profile of CO oxidation over as-synthesized Au—AlPO$_4$—H1 in presence of H$_2$ is shown in FIG. 16. Comparing to CO oxidation in absence of H$_2$ shown in FIG. 15, surprisingly, introduction of H$_2$ prevented the deactivation of the catalyst without changing the initial CO conversion. A 100% CO conversion is shown obtained for more than 8 h. H$_2$ oxidation did not occur during the entire course of the reaction at 25° C. The onset for the H$_2$ oxidation of Au—AlPO$_4$—H1 catalyst is about 40° C., below which the negligible oxidation of H$_2$ has been observed. This observation is in sharp contrast to the reported partial H$_2$ deactivation of CO oxidation over Au/FeO$_x$ and doped Au/Al$_2$O$_3$. This difference in catalytic behaviors can be attributed to the unique non-oxide structural features of the AlPO$_4$—H1 support. Although the catalytic mechanism is not clear, the addition of $H_2$ in the reactant stream might prevent the formation of surface formate/carbonate species by forming the hydroxyl group.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

We claim:

1. A surface-stabilized gold nanocatalyst, comprising;
a solid support having stabilizing surfaces for supporting gold nanoparticles, and
a plurality of gold nanoparticles having an average particle size of less than 8 nm disposed on said stabilizing surfaces, wherein said surface-stabilized gold nanocatalyst provides a $T_{50}$ during lightoff testing of <−30° C. after calcining, wherein said solid support comprises a plurality of nanoparticles comprising a rare earth phosphate.

2. The nanocatalyst of claim 1, wherein said rare earth phosphate comprises $LaPO_4$.

3. The nanocatalyst of claim 2, wherein said $T_{50}$ during lightoff testing is between −60° C. and −90° C.

4. The nanocatalyst of claim 2, wherein said $T_{50}$ during lightoff testing is between −80° C. and −90° C.

5. The nanocatalyst of claim 1, wherein said stabilizing surfaces comprise nanostructure surfaces.

6. A method of forming surface-stabilized gold nanocatalysts, comprising:
providing nanoparticles of a first chemical composition;
depositing an atomic layer of a second chemical composition different from said first composition on said nanoparticles to form multi-layer support particles having stabilizing surfaces, and
depositing a plurality of gold nanoparticles having an average particle size of less than 8 nm on said stabilizing surfaces,
wherein said surface-stabilized gold nanocatalyst provides a $T_{50}$ during lightoff testing of >−30° C. after calcining.

7. The method of claim 6, wherein said first and second chemical compositions are both metal oxides.

8. The method of claim 6, wherein said first or said second chemical composition is an aluminum oxide.

9. The method of claim 6, wherein said second chemical composition comprises titanium dioxide.

10. The method of claim 6, wherein said second chemical composition is deposited using a surface sol-gel process.

11. A surface-stabilized gold nanocatalyst, comprising:
a solid support having stabilizing surfaces for supporting gold nanoparticles, and
a plurality of gold nanoparticles having an average particle size of less than 8 nm disposed on said stabilizing surfaces,
wherein said surface-stabilized gold nanocatalyst provides a $T_{50}$ during lightoff testing of <−30° C. after calcining, wherein said solid support is a multi-layer support comprising at least a first layer and a second layer, said second layer being disposed on said first layer, wherein said second layer is an atomic layer that provides said stabilizing surfaces and said first and second layer are chemically distinct.

12. The nanocatalyst of claim 11, wherein said second layer comprises aluminum oxide.

13. The nanocatalyst of claim 12, wherein said first layer comprises titanium dioxide.

14. The nanocatalyst of claim 13, wherein said titanium dioxide is in the form of nanoparticles.

15. The nanocatalyst of claim 14, wherein said second layer is a metal oxide layer.

16. The nanocatalyst of claim 12, wherein said first layer comprises AlOOH.

17. The nanocatalyst of claim 16, wherein said AlOOH is in the form of nanoparticles.

18. The nanocatalyst of claim 11, wherein said second layer comprises titanium oxide.

* * * * *